T. C. HARGRAVE.
Car Axle Boxes.

No. 155,613.  Patented Oct. 6, 1874.

Attest  
Will H. Motou  
Wm E. Chaffee

Inventor  
Thomas C. Hargrave  
Per A. H. & R. K. Evans  
Attorneys

UNITED STATES PATENT OFFICE.

THOMAS C. HARGRAVE, OF BOSTON, MASSACHUSETTS.

IMPROVEMENT IN CAR-AXLE BOXES.

Specification forming part of Letters Patent No. 155,613, dated October 6, 1874; application filed March 10, 1874.

*To all whom it may concern:*

Be it known that I, THOMAS C. HARGRAVE, of Boston, Massachusetts, have invented a new and useful Improvement in Automatic Oilers for Railway and other Journals, of which the following is a clear, full, and exact description, reference being had to the accompanying drawings, making a part of this specification, in which—

Figure 1:
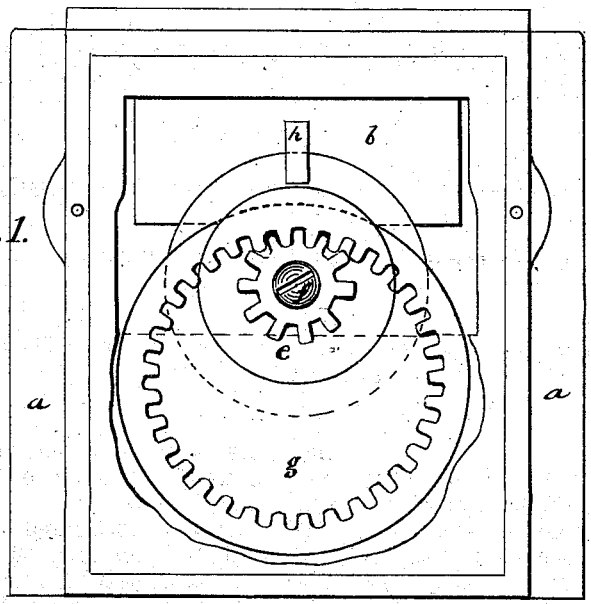
Figure 2:
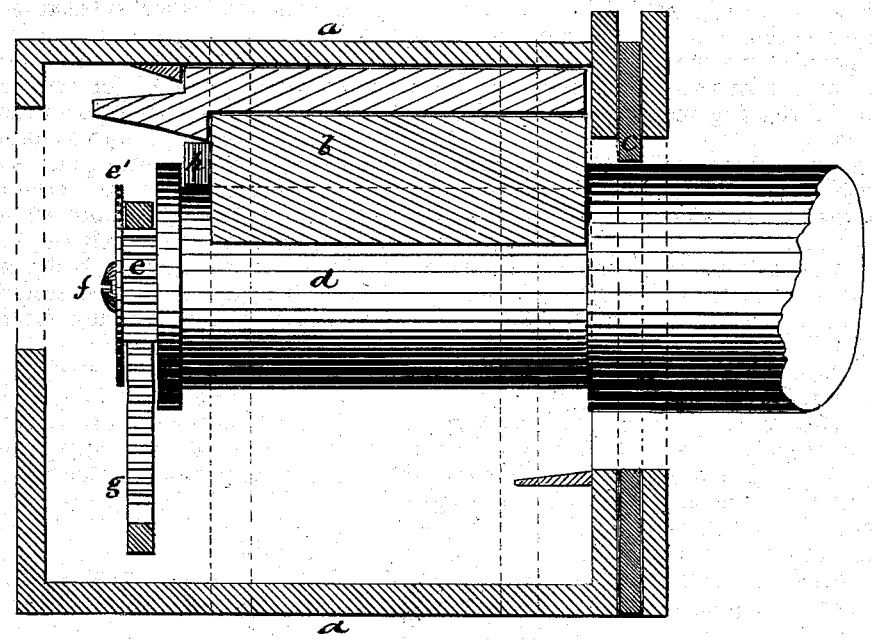

Figure 1 is an end elevation of my oiler. Fig. 2 is a longitudinal section.

My invention relates to means for oiling, more particularly the journals of railway-carriages; and it consists in automatically applying the lubricating material to the end of the journals.

To enable others skilled in the art to make and use my invention, I will proceed to describe the exact manner in which I have carried it out.

In the drawings, *a a* represents the ordinary housing or case for the journal; *b*, the holding-plate, and *c* the box. On the end of the journal *d* is secured the pinion *e* with a washer, *e'*. The bolt *f* secures the pinion and washer to the center of the shaft *d*. Over the pinion *e* is suspended the large ring *g*, having teeth on its inner edge, and kept in place by the washer *e'*. The ring *g* is of sufficient diameter to reach nearly to the bottom of the housing or oil-well. To make up for any slight deficiency in this regard, the wheel may be furnished with flexible tags of suitable material. As the shaft revolves, the pinion *e* causes the ring *g* also to revolve, and this brings up the oil, and distributes a portion on the end of the shaft and journal.

The quantity distributed may be increased, if desired, by providing the holding-plate *b* with a rib, *h*, projecting over the flange of the journal, when the lubricant is in a very fluid state.

It is evident that the pinion and toothed wheel or ring may be dispensed with, and a plain ring and wheel substituted with good results.

I am aware that a smooth ring has been used upon a pinion, for the purpose of feeding up the lubricant upon the journal; but this construction is objectionable, as the ring has no positive motion, but is solely dependent upon friction for its action, and the feed is thereby rendered more or less uncertain. By means of my toothed ring I secure a positive motion to the ring, and a certainty to the feed of the lubricant. I therefore do not claim, broadly, the use of a ring for feeding the lubricant; but What I do claim as new, and desire to secure by Letters Patent, is—

In combination with a car-axle journal, the pinion *e* and toothed ring *g*, substantially as and for the purpose set forth.

T. C. HARGRAVE.

Witnesses:
JOSEPH W. TUCKER,
A. R. POTTER.